(12) United States Patent
Kafri

(10) Patent No.: US 6,754,316 B2
(45) Date of Patent: Jun. 22, 2004

(54) METHOD AND APPARATUS FOR REGISTERING UNANSWERED TELEPHONE CALLS

(75) Inventor: Oded Kafri, Beer Sheva (IL)

(73) Assignee: Varicom Communications Ltd., Tel-Aviv (IL)

(*) Notice: Subject to any disclaimer, the term of this patent is extended or adjusted under 35 U.S.C. 154(b) by 0 days.

(21) Appl. No.: 10/275,897

(22) PCT Filed: Apr. 16, 2001

(86) PCT No.: PCT/IL01/00346
§ 371 (c)(1),
(2), (4) Date: Nov. 12, 2002

(87) PCT Pub. No.: WO01/80527
PCT Pub. Date: Oct. 25, 2001

(65) Prior Publication Data
US 2003/0228006 A1 Dec. 11, 2003

(51) Int. Cl.$^7$ .............................................. H04M 11/00
(52) U.S. Cl. ................. 379/93.23; 379/93.24; 379/88.25
(58) Field of Search ........................... 379/93.23, 93.24, 379/90.01, 88.25, 88.26, 142.06, 142.07, 142.17, 88.21; 709/206

(56) References Cited

U.S. PATENT DOCUMENTS 5,974,449 A * 10/1999 Chang et al. ................ 709/206
6,282,275 B1 * 8/2001 Gurbani et al. ........ 379/142.06

FOREIGN PATENT DOCUMENTS

GB 2322036 A * 8/1998 ............ H04M/3/50
JP 410200635 A * 7/1998 ............ H04M/3/42

* cited by examiner

Primary Examiner—Melur Ramakrishnaiah
(74) Attorney, Agent, or Firm—AlphaPatent Associates Ltd.; Daniel J. Swirsky

(57) ABSTRACT

A method and apparatus for registering unanswered telephone calls is provided. The method includes directing the unanswered call to an external server, recording details of the calling telephone, including the telephone number of the calling telephone (caller ID), the time and the date of the call, and notifying the called telephone of the details of the unanswered telephone call.

14 Claims, 2 Drawing Sheets

METHOD AND APPARATUS FOR REGISTERING UNANSWERED TELEPHONE CALLS

FIELD AND BRIEF BACKGROUND DISCUSSION

The present invention relates to a method and apparatus for registering unanswered telephone calls.

One of the most useful features of cellular telephone systems is the registration of unanswered calls. If the telephone being called (call recipient) does not reply to a call, either because the line is busy or unanswered for any other reason, the cellular telephone having caller ID facility, can remember the number of the caller and display it on the screen. If the recipient of the non-answered telephone call wishes, he can dial the number displayed at a push of a button and initiate a call at his leisure to the person who tried unsuccessfully to call him.

This feature is limited to telephones with a built in caller ID facility and an alpha-numeric display for displaying the calling number. In addition, the telephone requires the appropriate software and hardware means to select the number and to dial it. Therefore, this feature mainly exists in cellular telephone systems, which contain sophisticated DSP (Digital Signal Processing) hardware enabling this feature.

However, if the cellular telephone is shut down or disabled for example, in public places such as hospitals and airplanes, this facility is not available.

SUMMARY OF THE PRESENT INVENTION

The present invention overcomes the limitation of the previous techniques and enables registration of unanswered calls for any telephone system including analog wired telephone systems. In addition, the present invention enables cellular phones to register unanswered calls even when the telephone is shut down.

There is thus provided in accordance with an embodiment of the invention, apparatus and a method for registering unanswered telephone calls.

The method includes directing the unanswered call to an external server; recording details of the calling telephone, including the telephone number of the calling telephone (caller ID), the time and the date of the call, and notifying the called telephone of the details of the unanswered telephone call.

Furthermore, in accordance with an embodiment of the invention, the external server is a voice mail box capable of identifying the telephone number of the calling telephone (caller ID). The step of notifying includes the step of the voice mail box preparing a message containing the details and forwarding the message to the calling telephone.

Furthermore, in accordance with an embodiment of the invention, the external server is a unified message box and the details of the calling telephone are notified via e-mail or through a facsimile machine.

Furthermore, in accordance with an embodiment of the invention, the step of notifying includes the step of the unified message box preparing a message containing the details.

Alternatively, in accordance with an embodiment of the invention, the step of notifying includes the steps of the external server associating the telephone number of the called telephone with the e-mail address; and notifying the called telephone by an e-mail message.

Furthermore, in accordance with an embodiment of the invention, the step of notifying includes the steps of storing the details in a message database, the message database in communication with a plurality of roaming servers; and the calling telephone retrieving the details from any of the plurality of roaming servers. The step of retrieving includes the step of the message being retrieved via telephone or a facsimile machine.

DESCRIPTION OF THE INVENTION

In the present art, if the telephone line is busy or there is no answer at the called phone, there are two possibilities:

1. If the called phone is a cellular phone a message appears advising the called phone that a call has been missed and if caller ID is available, the caller number is displayed.
2. If the called phone has a voice box the caller reaches the voice box, where he can leave a message or send an e-mail.

It should be noted that situations 1 & 2 are independent and in the case of cellular phone that has a voice box both sequences occurs independently.

Figure 1:
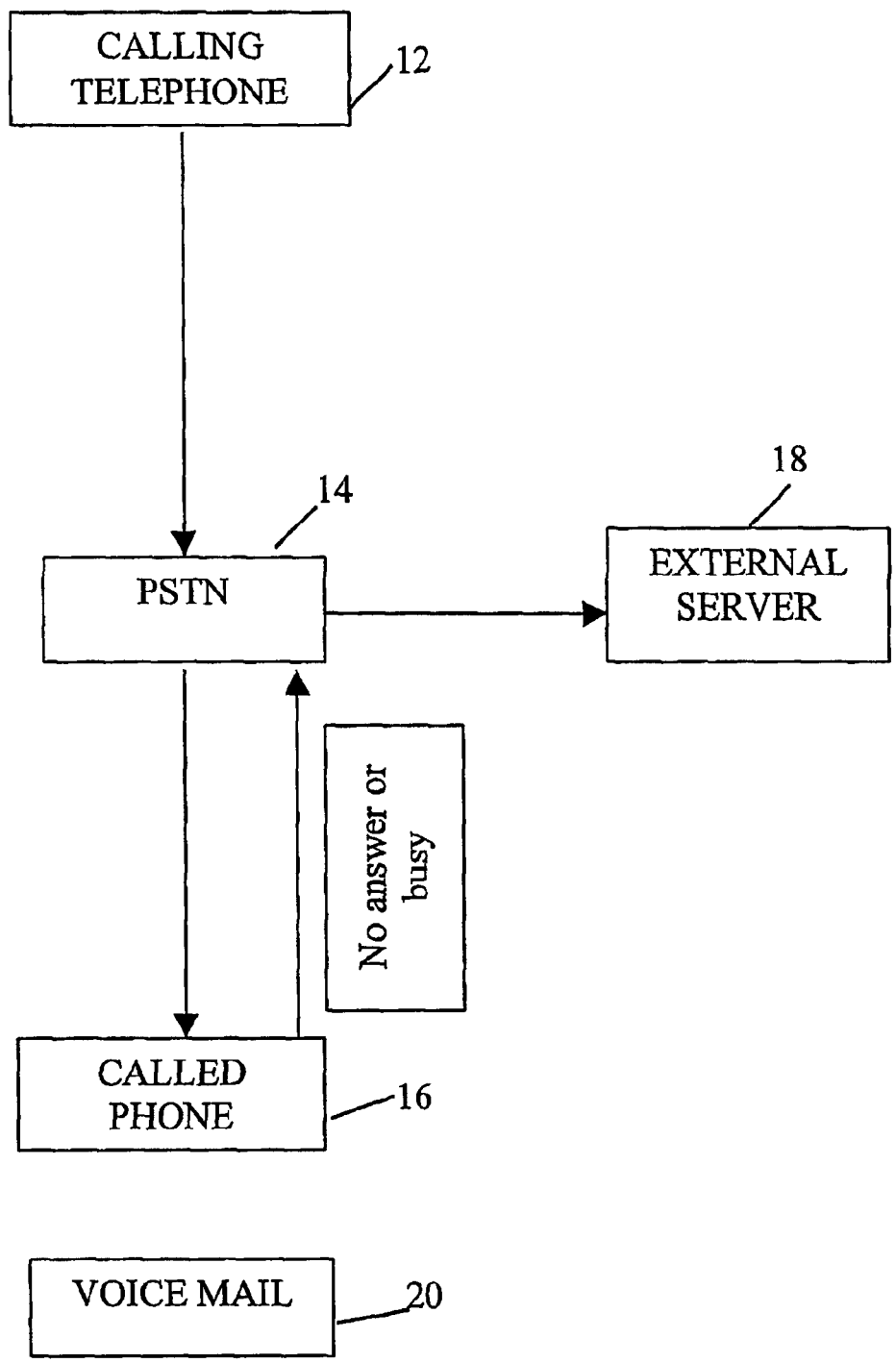
FIG. 1 is a schematic flow chart illustration of the registration of an unanswered call in an external server according to an embodiment of the present invention.

Reference is now made to FIG. 1, which is a schematic flow chart illustration of the registration of an unanswered call in an external server according to an embodiment of the present invention.

In the exemplary embodiment of FIG. 1, a call is made by the calling telephone 12 via the PSTN 14 to another telephone 16. If there is no answer or the line is busy, the call is directed to an external server 18. The external server 18 registers the ID of the calling telephone 12 and the time and the date of the call.

If the called phone 16 has voice box facilities, the call is forwarded to a voice box system 20. If the voice box system 20 has caller ID available, the identity of the called phone 12 will be known. Even if the person calling does not leave a message, the voice box 20 will still register the ID of the caller with an empty message. In this case, when the called person 14 will access his voice box 20 he will obtain a record of an unanswered call from telephone X, where X is uncalled caller ID detected. If the voice box has switching capabilities it will be possible to initiate a call directly from the voice box 20 to the calling telephone 12.

In an alternative embodiment of the invention, calls are forwarded to a unified message box (instead of a voice box). A unified message box is a box that can store both voice e-mail and fax. Moreover, the person who reaches this box can hear the voice message or his e-mail via text to speech engine (TTS) available for example by L&H (Lernout & Hauspie, USA), for example or even faxes by OCR (Optical Character Recognition) available by Ligatura Inc, for example and then read by TTS.

These messages can also be read from the e-mail box at the computers of the voice box owner.

In an alternative embodiment, similar results can be achieved without the use of a specific voice box. For example, the T-mailer server supported by Varicom Communications Ltd, the assignees of the present invention, provides a linkage between the user telephone and his e-mail address.

The T-Mailer server is similar to the proxy server described in PCT Patent Application: PCT/IL99/00516 assigned to the Assignees of the present invention. The T-mailer server generally comprises a Computer Telephone Integration (CTI) card connected to a wave API (Application Program Interface) and a message storage device. The server further comprises components such as a voice proxy telephone server and a transport provider for receiving and forwarding voice/text messages.

In this case, once a call is made to the T-mailer service using an assigned telephone number, the T-mailer software associates, through a look-up table or database (such as SAL, available from by Microsoft Corporation Inc), the appropriate e-mail address of the called telephone owner, creates an e-mail with attached wave file and sends it to the e-mail address of the called telephone owner.

Figure 2:
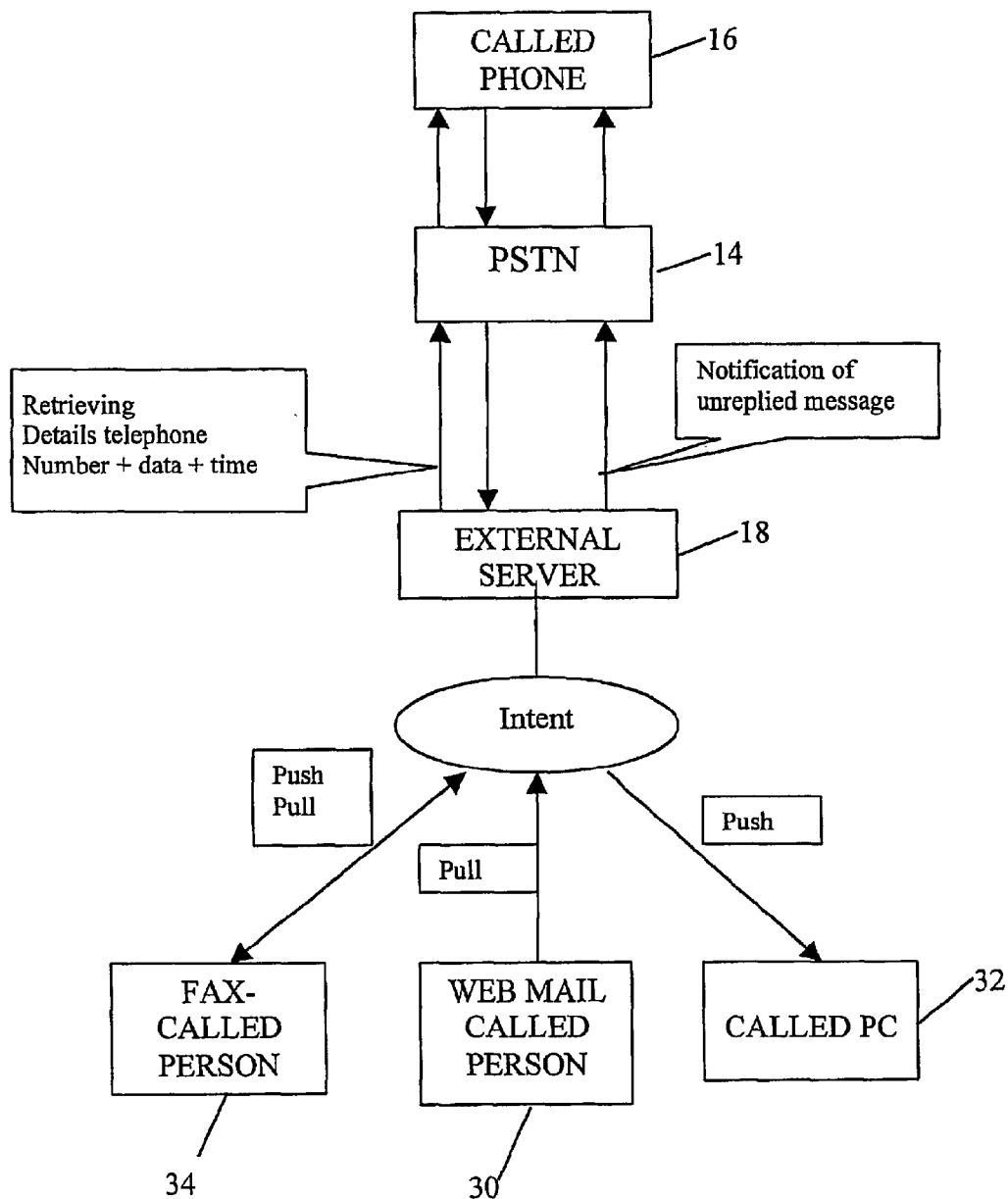
FIG. 2 is a schematic flow chart illustration of the retrieval of the message details of an unanswered call according to an embodiment of the present invention.

Reference is now made to FIG. 2, which is a schematic flow chart illustration of the retrieval of the message details of an unanswered call, according to an embodiment of the present invention.

The unanswered message details including the phone number of the caller, the date and the time of the unanswered message can be retrieved in several different ways. For example, the message details by the calling phone can be retrieved by the called phone 16 via the PSTN 14 from the called person's voice box. Alternatively, using an external server, such as the T-mailer server, described hereinabove, the details can be sent by e-mail 30, directly to a PC associated with the called person 32 or by fax 34 using the unified message boxes of T-mailer.

It is apparent to persons skilled in the art that using Voice Mail box and T-mailer service, an e-mail message without voice attachment can be sent having a subject line entitled, for example "A reply was not made to a call from telephone X" where X is the caller ID of the calling person.

This feature enables to people who have access to e-mail to obtain notification via their e-mail about unsuccessful (unanswered) calls made to them, even if their handset does not have the unanswered feature or their cellular phone is shut down.

While the invention has been described with respect to embodiments, it will be appreciated that these are set forth merely for purposes of example, and that variations and applications can be made. Many other variations, modifications and applications of the invention will also be apparent to those skilled in this field.

What is claimed is:

1. A method for registering missed telephone calls, comprising:

routing calls missed or unanswered by the called telephone to an external server, wherein said server is operatively independent of the called telephone and wherein said server is configured to be operable with any one of a group of signaling protocols including STP and PRI-ISDN;

the external server recording details of the calling telephone, said details including at least the telephone number of the calling telephone (caller ID), the time and the date of the call; and directly notifying the called telephone of said details of the unanswered or missed telephone calls.

2. The method according to claim 1, wherein said external server is a voice mail box, said voice mail box identifying the telephone number of the calling telephone (caller ID) and wherein said step of notifying comprises the step of said voice mail box preparing a message containing said details and forwarding said message to said called telephone.

3. The method according to claim 1, wherein said external server is a unified message box and wherein said details of the calling telephone are notified via e-mail or through a facsimile machine.

4. The method according to claim 3, wherein said step of notifying comprises the step of said unified message box preparing a message containing said details.

5. The method according to claim 1, wherein said step of notifying comprises the steps of:

said external server associating the telephone number of the called telephone with the e-mail address; and notifying the called telephone by an e-mail message.

6. The method as described in claim 1, wherein said step of notifying comprises the steps of:

storing said details in a message database, said message database in communication with a plurality of roaming servers; and a telephone calling at least one of said plurality of roaming servers and retrieving said details.

7. The method as described in claim 6, wherein said step of retrieving comprises the step of said message being retrieved in voice mode via telephone or as a facsimile via a facsimile machine.

8. The apparatus according to claim 1, wherein said external server is a unified message box and wherein said details of the calling telephone are notified via e-mail or through a facsimile machine.

9. The apparatus according to claim 8, wherein said unified message box is configured to prepare a message containing said details.

10. The apparatus according to claim 1, wherein said external server is configured to associate the telephone number of the called telephone with an e-mail address and said call notifier is configured to send an e-mail message to the called telephone.

11. The apparatus according to claim 1, wherein said call notifier is configured to store said details in a message database, said message database being in communication with a plurality of roaming servers; and wherein a telephone calls at least one of said plurality of roaming servers to retrieve said details.

12. The apparatus as described in claim 11, wherein said telephone retrieves the message in voice or facsimile mode.

13. Apparatus for registering missed telephone calls, comprising:

an external server in communication with a telephone subscriber network and operatively independent of the called telephone, operable with any one of a group of signaling protocols including STP and PRI-ISDN, ;said external server comprising:

a call identifier, said call identifier recording at least the telephone number of the calling telephone (caller ID), and the time and the date of the call; and a call notifier for notifying the called telephone of the details of the unanswered or missed telephone calls.

14. The apparatus according to claim 13, wherein said external server is a voice mail box, said voice mail box identifying the telephone number of the calling telephone (caller ID) and wherein said voice mail box is configured to prepare and forward a message to the called telephone.

* * * * *